United States Patent [19]
Bowman

[11] Patent Number: 5,452,740
[45] Date of Patent: * Sep. 26, 1995

[54] WATER CONSERVATION SYSTEM

[76] Inventor: Gerald E. Bowman, 179 Plumosa Dr., Largo, Fla. 34641

[*] Notice: The portion of the term of this patent subsequent to Aug. 23, 2011 has been disclaimed.

[21] Appl. No.: 280,366

[22] Filed: Jul. 26, 1994

Related U.S. Application Data

[63] Continuation-in-part of Ser. No. 168,529, Dec. 16, 1993, Pat. No. 5,339,859.

[51] Int. Cl.$^6$ .................................................. F16K 49/00
[52] U.S. Cl. ...................... 137/337; 137/599.1; 137/606; 236/12.12
[58] Field of Search .................. 137/337, 599.1, 137/606; 236/12.12

[56] References Cited

U.S. PATENT DOCUMENTS

| | | | |
|---|---|---|---|
| 2,842,155 | 7/1958 | Peters | 137/337 |
| 3,776,261 | 12/1973 | Houghton | 137/337 |
| 4,086,956 | 5/1978 | Block et al. | 165/38 |
| 4,697,614 | 10/1987 | Powers et al. | 137/337 |
| 4,930,551 | 6/1990 | Haws | 137/337 |
| 5,181,656 | 1/1993 | Schwerdt | 137/625.5 X |
| 5,339,859 | 8/1994 | Bowman | 137/337 |

*Primary Examiner*—Stephen M. Hepperle
*Attorney, Agent, or Firm*—Donald R. Fraser

[57] ABSTRACT

A water conservation system including a thermostatically controlled valve means effectively diverts water from the hot water tank to a storage tank until the temperature or the water therefrom reaches a predetermined temperature. The stored water is then caused to be mixed with the water directed to the cold water conduit initially be pressure in the storage tank and subsequently by siphon action.

3 Claims, 2 Drawing Sheets

WATER CONSERVATION SYSTEM

BACKGROUND OF THE INVENTION

This is a continuation in part of application of U.S. Pat. application Ser. No. 08/168,529 filed Dec. 16, 1993, now U.S. Pat. No. 5,339,859.

It has been found that in a typical home in the United States, more than 9000 gallons of water are wasted each year as the domestic hot water line is cleared of water at ambient temperature until heated water reaches the outlet faucet.

Not only is the loss of water a serious concern in those geographical areas of the country where water shortages are prevalent, but also an energy loss occurs.

DESCRIPTION OF THE PRIOR ART

Amongst the systems which have been developed to overcome this problem use is made of a demand-triggered design. The system employs a small high value pump installed under the bathroom sink furthest from the water heater. The pump and an associative solenoid actuated valve connect the hot and cold water lines under the sink.

When hot water is desired, any hot water faucet is turned on and thence off very quickly. This action energizes the pump which causes a circulation of water from the hot water pipe under the sink and diverts the water through the solenoid actuated valve back to the water heater through the cold water inlet line. This system utilizes existing plumbing.

As soon as a temperature sensor senses that the temperature of the circulating water has reached the desired level, the pump is stopped. Hot water is then immediately available at the hot water faucet.

In the above system any hot water faucet in the system will effectively commence the operation of the pump. Accordingly, if the pump is mounted under the sink which is located farthest from the water heater, instant hot water may be made to be available at any of the intermediate stations.

Amongst the other options available to conserve water involves the installation of a continuous hot water circulation pump which will direct water from the sink to the water heater through a separate return line.

It is also contemplated that in the recirculation system, the use of a 24-hour timer may be used to attempt to effect instantaneous hot water at the hot water outlet faucet. In such the timer can be programmed to energize the circulating pump only during those times of the day when the occupants would normally use hot water more frequently.

Much effort has been made to overcome problems found to exist in the prior art systems. These efforts are illustrated in the U.S. Pat. No. 4,086,956 to Block et al and U.S. Pat. No. 5,181,656 to Schwerdt, for example.

SUMMARY OF THE INVENTION

It is a primary object of the present invention to produce a water conservation system wherein the water in the hot water line is caused to be initially directed to a storage tank by temperature sensitive valve means which upon sensing the presence of hot water discharges the same through the outlet faucet.

Another object of the invention is to produce a system which automatically reintroduces water from a storage tank and mixes the previously stored water with unheated water from the main supply.

Another object of the invention is to produce a water conservation system wherein the heated water lines are maintained at a pressure greater than the unheated water lines.

The above, as well as other objects of the invention are typically achieved by water conservation systems comprising a source of pressurized water; a water heating means having an inlet and an outlet; first conduit means providing communication between the source of pressurized water and the inlet of the water heating means; an outlet faucet means having a hot water control valve and a cold water control valve; a water storage tank; second conduit means providing communication between the outlet of the water heating means and the water storage tank, the second conduit means including temperature sensitive control valve for selectively providing communication between the outlet of the water heating means and the hot water control valve of the outlet faucet means and simultaneously blocking the communication with the water storage tank; third conduit means providing communication between the source and the cold water control valve of the outlet faucet means, the third conduit means including means for reducing the pressure of the water flowing therein; and fourth conduit means providing communication between the third conduit means and the interior of the water storage tank, whereby actuation of the hot water control valve of the outlet faucet means mutually establishes communication between the outlet of the water heating means and the water storage tank through the second conduit means, and subsequently establishes communication between the outlet of the water heating means and the hot water control valve of the outlet faucet when the temperature sensitive control valve in said second conduit senses heated water.

BRIEF DESCRIPTION OF THE DRAWING

The above objects and features of the invention will become readily apparent to one skilled in the art by considering the following detailed description of the preferred embodiment of the invention in the light of the accompanying drawing, in which.

DETAILED DESCRIPTION OF THE PREFERRED EMBODIMENT OF THE INVENTION

Figure 1:
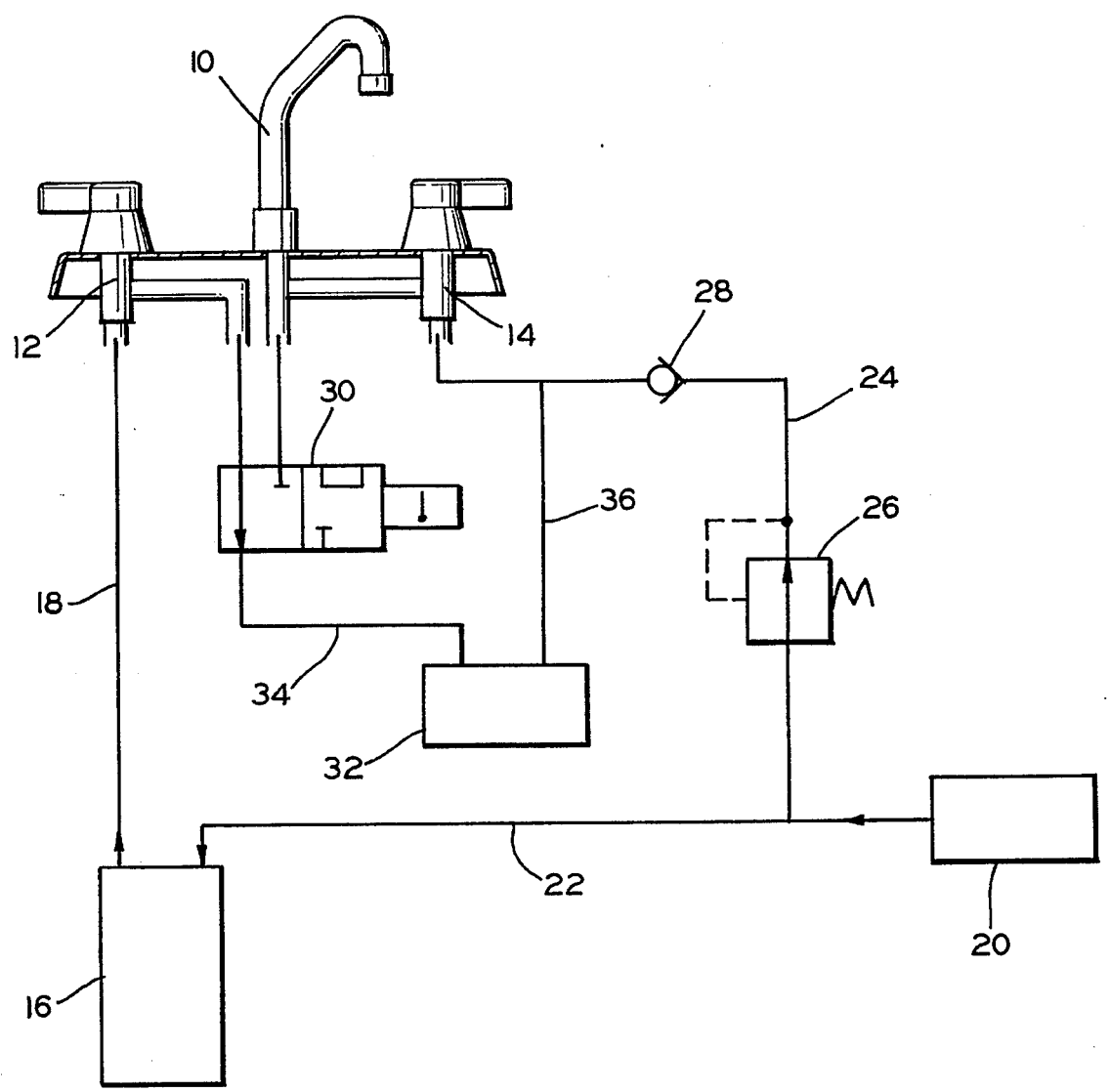
FIG. 1 is a schematic illustration of a water conservation system incorporating the features of the invention.

With reference to the drawing, there is illustrated a system which embodies the features of the present invention. More specifically, the water conservation system illustrated in FIG. 1 includes a conventional single spigot water faucet 10 having a hot water control valve means 12 and a cold water control valve 14.

The hot water control valve means 12 is coupled to a water heater tank 16 through a water conduit 18. Water is typically supplied to the tank 16 from a main water supply 20 (municipal water main, for example) through a water conduit 22. The water heater tank 16 is typically provided with heat exchange means not shown, which are coupled to a source of energy such as gas or electricity.

The cold water control valve means 14 is coupled to the main water supply 20 through a water conduit 24. The water conduit 24 is provided with a pressure reducing valve means 26 and a one-way check valve 28. The pressure reducing valve means 26 is effective to reduce the fluid pressure of the supply from the supply main 20 for 55 psi to 45 psi, for example.

The hot water control valve means 12 is connected to the outlet faucet 10 through a normally closed portion of a thermostatically controlled valve 30. The valve means 12 is also connected to a storage tank 32 through a normally open portion of the thermostatically controlled valve 30 and a water conduit 34.

The outlet of the storage tank 32 is connected to the conduit 24 through a conduit 36 upstream from the disposition of the check valve 28.

In operation, it will be readily apparent that the initial actuation or operating of the hot water control valve 12 will cause or permit the pressurized water in the conduit 18 to flow through the valve 12, the thermostatically controlled valve 30, the conduit 34 and into the storage tank 32. The temperature of the water is typically at ambient and will flow until the heated water emitted from the tank 16 enters the valve 30 causing the flow to be diverted from flowing to the storage tank 32 to flow to and out of the faucet 10. The heated water is maintained at the pressure of the water from the supply 20. Accordingly, it will be appreciated that the water at ambient temperature which normally would be allowed to be lost and wasted has been collected in the storage tank 32.

The stored water in the tank 32 may be then mixed with water introduced into the system from the main supply 20 when the cold water control valve means 14 is opened to allow cold water to flow through conduit 24, control valve means 14 and the faucet 10. Since the cold water is at a pressure of 45 psi and the water in the storage tank 32 is initially at 55 psi, the stored water will flow out of the storage tank 32 through the conduit 36 and thence into the conduit 24.

The pressure in the storage tank 32 then drops to the line pressure from 55 psi to 45 psi. As the water continues to flow from the main supply 20 a venturi effect occurs at the junction of the conduits 24 and 36 causing additional water to be siphoned from the storage tank 32.

It is readily apparent that the aforedescribed system will efficiently and economically conserve the water in a typical domestic water system by directing unheated water in the hot water line to a storage tank to conserve otherwise wasted unheated water. Only heated water is directed to the outlet faucet and the water in the storage tank is later caused to be introduced into and mixed with the incoming unheated water from the main supply.

As previously discussed should all water systems employ the system of the present invention, substantial water savings would be realized thereby reducing the consumers' costs as well as avoiding the necessity of rationing water in water scarce areas.

Figure 2:
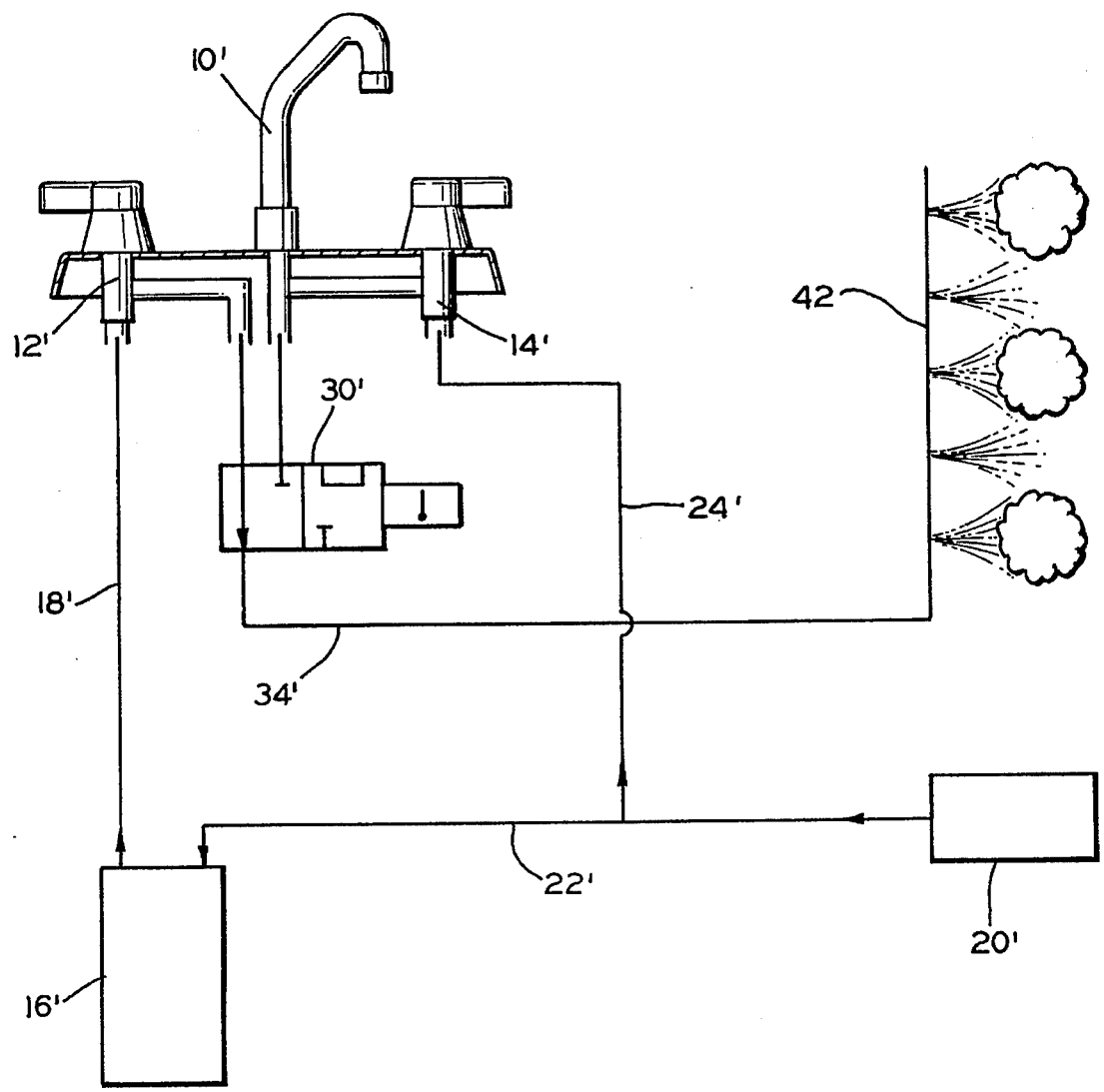
FIG. 2 is a schematic illustration of alternative water conservation system incorporating feature of the invention.

FIG. 2 illustrates a water conservation system designed to save the water that normally goes down the drain while waiting for hot water to arrive at the faucet. By diverting, the system causes the water to flow to shrubs and plants outside the home.

There is illustrated a source of water 20' from the city water supply or well. A conduit 22' is connected between the supply 20' and a water heater 16'. A conduit 18' is connected between the outlet of the water heater 16' and the hot water control valve 12' of a conventional single spigot water faucet 10' to a thermally actuated valve 30' where water is diverted to conduit 34' until hot water causes the valve 30' to open, allowing water to exit the faucet 10' and simultaneously prevent the water to enter the conduit 34'. During the period of time the valve 30' is normally closed to the faucet 10', the conduit 34' delivers the water to the outside of the house to a perforated pipe 42' which sprinkles bushes, shrubbery, or a sprinkler system.

It will be appreciated unheated water from the supply 20' will be delivered to the cold water control valve 14' through a conduit 24'. The valve 14' is operative to supply unheated water from the supply 20' to the outlet faucet 10'.

It is to be understood that the present invention is not limited in its application to the details of construction and arrangement of parts illustrated in the accompanying drawing, since the invention is capable of other embodiments, and of being practiced or carried out in various ways within the scope of the claims. Also, it is to be understood that the phraseology and terminology employed herein is for the purpose of description, and not of limitation.

What is claimed is:

1. A water conservation system comprising:

a source of pressurized water;

a water heating means;

a temperature sensitive valve normally directing the flow of ambient temperature water through a first outlet and thence directing elevated temperature water through a second outlet and simultaneously prohibiting the flow of water through the first outlet;

water conduit means for conveying water from said source to said temperature sensitive valve; and a manually controlled valve means disposed between said heating means and said temperature sensitive valve for controlling the admission of water from said source through said conduit to said temperature sensitive valve whereby the water is initially discharged from the first outlet until the temperature of the water reaches a predetermined level causing said temperature sensitive valve to close the first outlet and direct the discharge of the heated water from the second outlet.

2. A water conservation system as defined in claim 1 including an outlet faucet in communication with the second outlet of said temperature sensitive valve.

3. A water conservation system as defined in claim 2 including a water distribution system in communication with the first outlet of said temperature sensitive valve.

* * * * *